United States Patent [19]
LaPointe

[11] 3,991,845
[45] Nov. 16, 1976

[54] REMOTE SHIFT
[76] Inventor: Roger F. LaPointe, 13 Wyman St., Worcester, Mass. 01610
[22] Filed: Dec. 22, 1975
[21] Appl. No.: 643,078

Related U.S. Application Data
[63] Continuation-in-part of Ser. No. 514,293, Oct. 15, 1974, Pat. No. 3,944,013.

[52] U.S. Cl. .......................... 180/77 R; 180/77 H; 74/471 XY; 74/473 R; 91/413; 60/549; 60/580
[51] Int. Cl.² ........................................ B60K 26/02
[58] Field of Search .................. 180/77 R, 77 H; 74/471 XY, 473 R; 91/413; 251/57; 60/549, 580

[56] References Cited
UNITED STATES PATENTS

| | | |
|---|---|---|
| 1,987,733 | 1/1935 | DeFonbrune .......... 74/471 X Y UX |
| 2,297,026 | 9/1942 | Sanford ................................ 74/346 |
| 2,931,237 | 4/1960 | Backus ............................ 74/364 X |
| 2,974,766 | 3/1961 | Perkins ............................ 74/364 X |
| 3,015,344 | 1/1962 | Hausmann ....................... 91/413 X |
| 3,583,159 | 6/1971 | Paulet ............................. 251/57 X |

*Primary Examiner*—Edgar W. Geoghegan
*Attorney, Agent, or Firm*—Norman S. Blodgett; Gerry A. Blodgett

[57] ABSTRACT

Remote shift for a vehicle in which a shift lever at a remote station operates transmission gears in a motor vehicle by operating a piston and valve which produce and control hydraulic pressure which operates actuating pistons at the gears.

6 Claims, 8 Drawing Figures

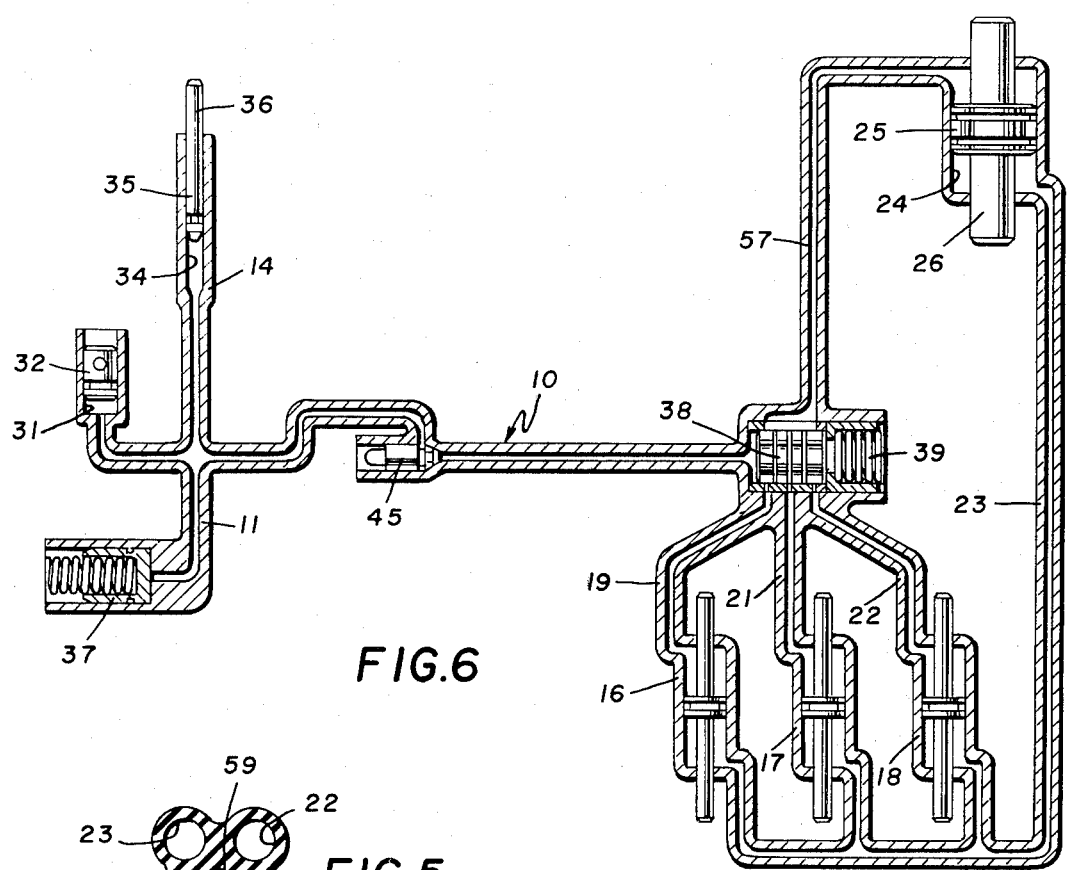
FIG.6
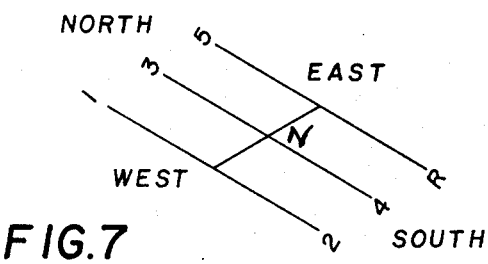
FIG.5
FIG.7
SHIFT PATTERN
WITHOUT BUTTON
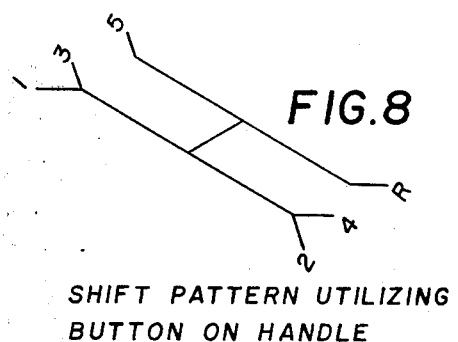
FIG.8
SHIFT PATTERN UTILIZING
BUTTON ON HANDLE

REMOTE SHIFT

This is a continuation-in-part of application Ser. No. 514,293 filed Oct. 15, 1974 now U.S. Pat. No. 3,944,013.

BACKGROUND OF THE INVENTION

In the design of motor vehicles it is almost mandatory that the gear shifting apparatus or transmission be located directly at the output shaft of the prime motor. In many cases it is desirable to locate the gear shift lever at a position substantially removed from the transmission. Such is often the case in connection with an automobile in which the motor is mounted adjacent the rear wheels, as in the case of the Volkswagon automobile. In such case, it is common practice to use control rods leading from the shift lever to the transmission. Such control rods, of course, introduce limitations into the system; for instance, the length of the rods is somewhat limited. Futhermore, the rods must pass through a straight path, thus substantially limiting the nature of the automotive design. Remote control devices have been developed, of course, and these are mostly of an electrical nature, but are only practical where the application is a very expensive one and warrants the cost of electrical servo-motors and the like. The problem arises particularly in connection with the design of earth moving equipment where, first of all, a rugged inexpensive design is desired and, secondly, the operator's cab and the drive mechanism are located at opposite ends of the vehicle with intricate machinery such as scrapers and the like located between them, so that it is impossible to provide a straight path for cables. Furthermore, cables and levers wear out and become inoperative due to the presence of dust and moisture. These and other difficulties experienced with the prior art devices have been obviated in a novel manner by the present invention.

It is, therefore, an outstanding object of the invention to provide a remote shift operating through hydraulic fluid.

Another object of this invention is the provision of a remote shift in which a connection between the gear shift lever and the transmission has a path which is of unlimited length and unlimited shape.

A further object of the present invention is the provision of a remote shift using hydraulic principles, which shift is simple in construction, inexpensive to manufacture, and which is capable of a long life of useful service with a minimum of maintenance.

A still further object of the invention is the provision of a remote shift in which there is no looseness or backlash between the shift handle and the actual transmission; in which the shifting action has the feel of a direct transmission shift; in which gear shifting can take place very rapidly; in which two different modes of shifting are available selectively; in which the weight of the apparatus is substantially reduced; in which the gear shift handle may be mounted adjustably on the vehicle to allow it to be positioned in accordance with the requirements of the driver.

With these and other objects in view, as will be apparent to those skilled in the art, the invention resides in the combination of parts set forth in the specification and covered by the claims appended hereto.

SUMMARY OF THE INVENTION

In general, the invention consists of a remote shift for use in a vehicle having an engine and a transmission. The remote shift is provided with a housing having a fixed portion and a movable portion, with a shift handle pivotally mounted about a first axis on the movable portion of the housing, and with a plurality of hydraulic motors located at the transmission. A pressure hydraulic line connects each motor to the housing and a return hydraulic line connects all of the motors to the housing. The movable portion of the housing is mounted on the fixed portion of the housing for rotation about a second axis extending at a right angle to the said first axis of pivotal rotation of the handle. The rotation of the handle about the first axis and the rotation of the handle and the movable portion of the housing about the second axis cause pressure to appear in the pressure hydraulic lines to operate the hydraulic motors and to produce shifting of the vehicle transmission.

More specifically, the fixed portion of the housing has a bore extending at a right angle to the said second axis. A mule piston is slidable in the bore and a piston rod extends co-axially of the piston and has a gear rack formed on it. The movable portion of the housing has an internal gear engaging an idler gear mounted in the fixed portion of the housing which in turn engages the gear rack, so that rotation of the handle and the movable portion about the said axis causes movement of the mule piston to generate pressure in the hydraulic fluid in an actuating circuit.

Rotation of the handle about the said first axis causes a piston to generate pressure in hydraulic fluid in a control circuit. The control circuit contains a slidable spool which is moved against a spring by hydraulic pressure in the circuit, the position of the spool determining the passage of hydraulic pressure into a selected one of the pressure hydraulic lines.

BRIEF DESCRIPTION OF THE DRAWINGS

The character of the invention, however, may be best understood by reference to one of its structural forms as illustrated by the accompanying drawings, in which:

FIG. 5 is a sectional view of a flexible unit incorporating hydraulic lines, FIG. 6 is a schematic view of the hydraulic circuitry of the invention, FIG. 7 is a shift pattern available with the apparatus of the invention, and FIG. 8 is a variation of the shift pattern available with the apparatus.

DESCRIPTION OF THE PREFERRED EMBODIMENT

Figure 1:
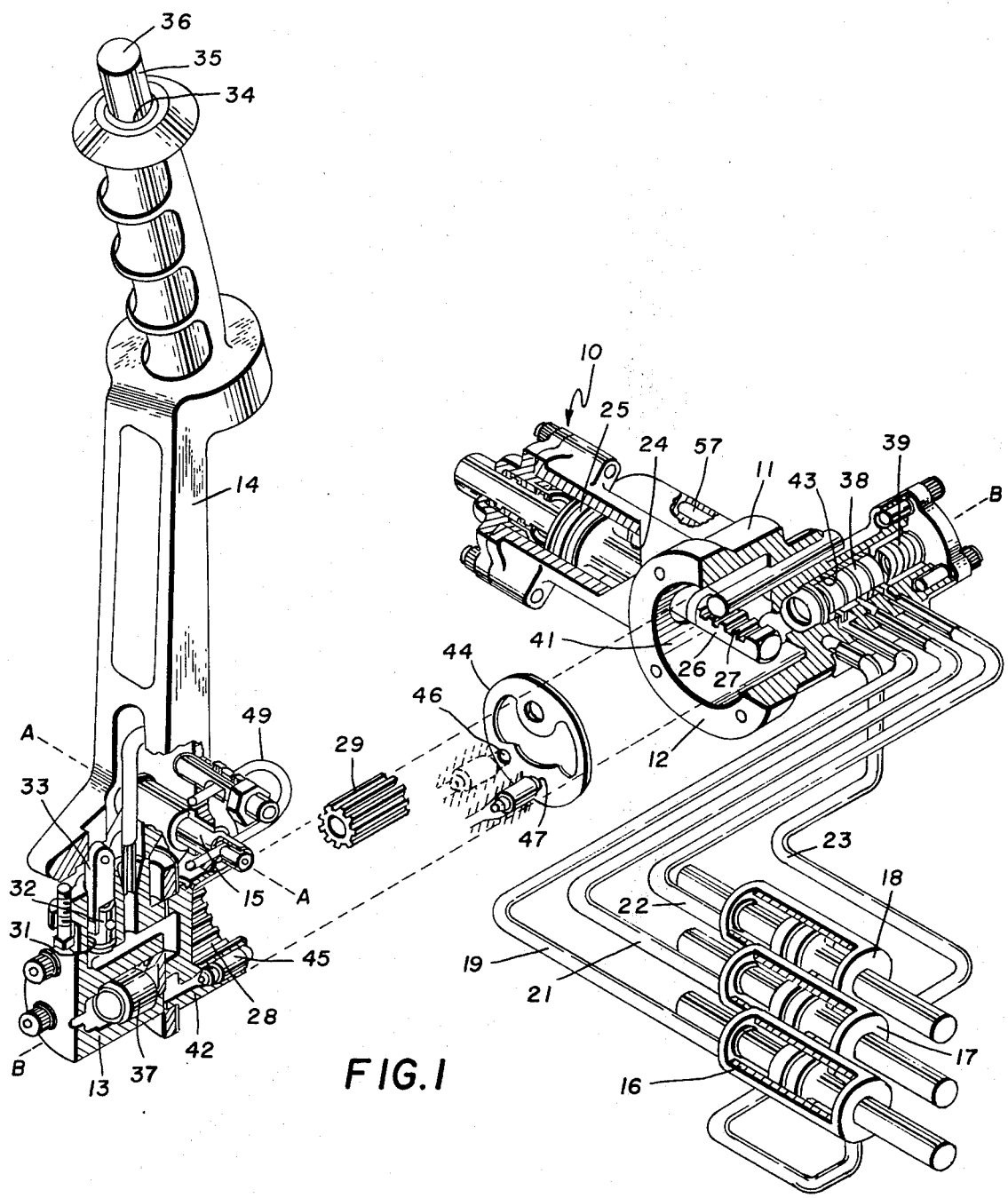
FIG. 1 is a perspective view with portions broken away of a remote shift incorporating the principles of the present invention.

Referring first to FIG. 1, wherein are best shown the general features of the invention, the remote shift, indicated generally by the reference numeral 10, is shown as having a housing 11 which consists of a fixed portion 12 and a movable portion 13. A shift handle 14 is pivotally mounted on the movable portion 13 for swinging motion about a first horizontal axis A—A. A plurality of hydraulic motors 16, 17, and 18 are mounted on the transmission of a motor vehicle which transmission serves to connect its engine to its drive wheels. The piston rods of the hydraulic motors engage the various shifting dogs (not shown) of the transmission, while the fixed portion 12 of the housing 11 is mounted at a portion of the vehicle body remote from the transmission.

Pressure hydraulic lines 19, 21, and 22 connect the hydraulic motors 16, 17, and 18 respectively, to the fixed portion 12 of the housing. A return hydraulic line 23 connects all of the motors to the fixed portion 12 of the housing. The movable portion 13 of the housing is mounted on the fixed portion 12 for rotation about a second horizontal axis B—B extending at a right angle to the axis of pivotal rotation of the handle A—A. The housing 11 would normally be mounted on the vehicle so that the axis B—B extends longitudinally of the vehicle with the apparatus located to the right of the driver facing forward. The movement of the handle 14 about its axis A—A could be described as movement in the pitch mode, while movement of the handle 14 and the movable portion 13 of the housing about the axis B—B could be considered as movement in the roll mode. Movement of the handle in the pitch mode and in the roll mode in various combinations, causes the desired operation of the hydraulic motors 16, 17, and 18 and, therefore, brings about the shifting of the transmission through the various gears.

The fixed portion 12 of the housing is formed with a bore 24 whose axis lies at a right angle to the axis B—B and intersects it. Slidable in the bore is a mule piston 25 having a piston rod 26, which rod is formed as a gear rack 27. The movable portion 13 of the housing is provided with an internal gear 28 which engages an idler gear 29 rotatably mounted in the fixed portion of the housing and engaging the gear rack 27. Rotation of the handle and the movable portion, therefore, about the axis B—B causes movement of the mule piston 25 to bring about pressure in hydraulic fluid contained in the actuating circuit of the apparatus.

The movable portion 13 of the housing is formed with a vertical bore 31 whose axis intersects and extends at a right angle to the axis B—B. In this bore is slidably carried a piston 32 which is connected by a link 33 to the handle 14 at a point spaced horizontally away from the pivotal axis A—A, so that movement of the handle (in the pitch mode) about the axis A—A generates pressure in hydraulic fluid in a control circuit. A bore 34 extends lengthwise of the handle 14 and opens onto the free end of the handle. A piston 35 is slidable in the bore and has an extension 36 extending externally of the bore in position to be engaged on occasion by the operator's thumb, so that movement of the piston 35 also generates pressure in the hydraulic fluid in the control circuit. The control circuit also contains a pressure accumulator 37. Included in the control circuit is a slidable spool 38 which is moved against a spring 39 by hydraulic pressure in the circuit. The position of the spool determines the passage of hydraulic pressure from the mule piston 25 into one of the pressure hydraulic lines 19, 21, and 22.

The fixed portion 12 of the housing is provided with a large bore 41 in which is rotatably carried a cylindrical element 42 extending from the movable portion 13. A smaller bore 43 extends coaxially of and from the bottom of the large bore 41. A plate 44 extends across the bottom of the large bore. The radial end surface of the cylindrical element 42 slides over the surface of the plate 44 as the movable element 13 rotates (in the roll mode) about the axis B—B. A check valve 45 mounted in the said cylindrical element engages an indentation 47 formed on the plate 44 and located to be engaged by the check valve at a point between the extreme ends of rotation of the movable element.

Figure 2:
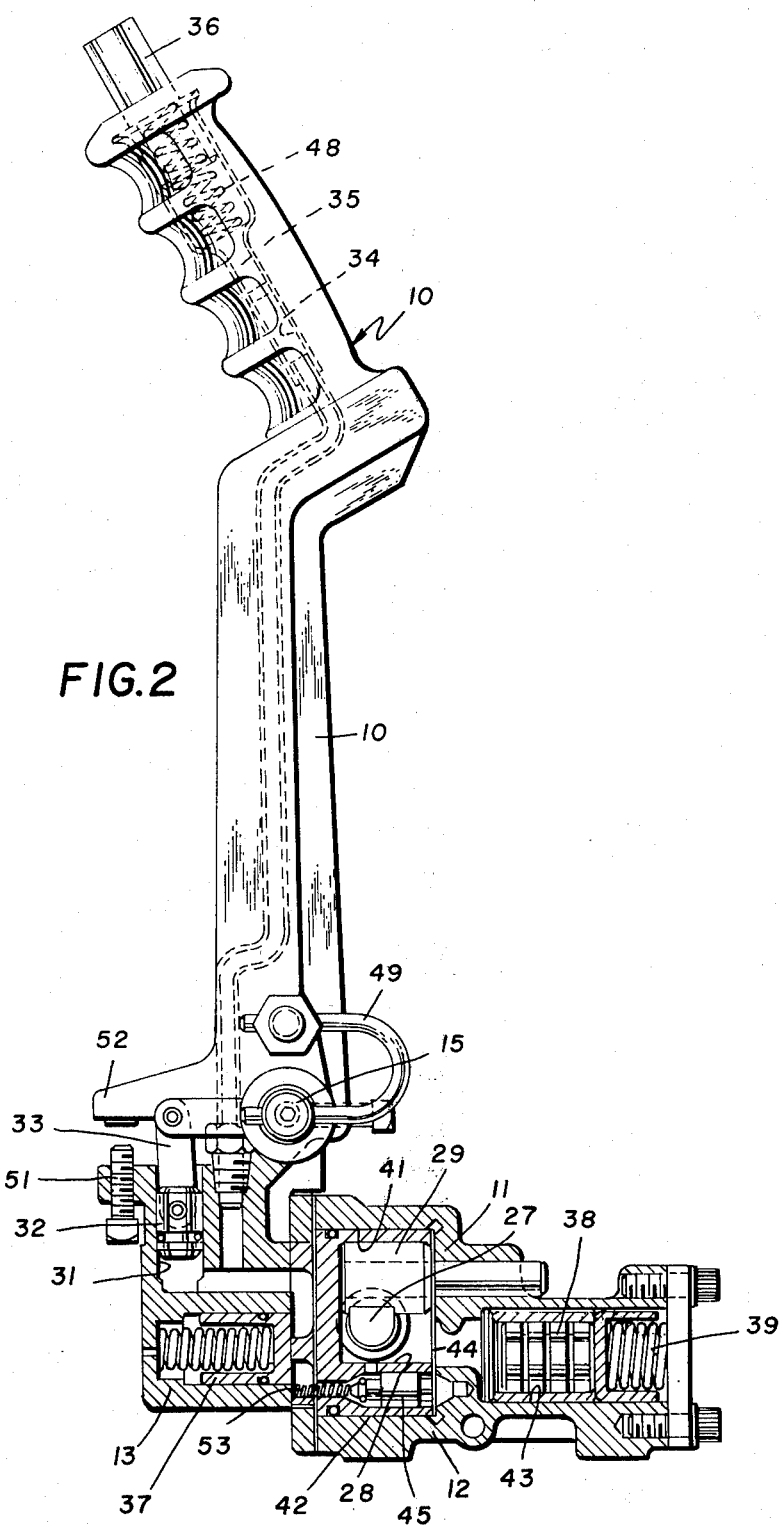
FIG. 2 is a vertical sectional view of a portion of a remote shift.

Referring to FIG. 2, it can be seen that the piston 35 is maintained in its upper position by hydraulic fluid. A lead spring 49 in the form of a U-shaped metal rod causes the handle 14 to be biased to the right in FIG. 2. A stop screw 51 engages an abutment 52 formed on the handle 14 to limit its movement to the left. A small coil spring 53 forms part of the check valve 45 to bias the body of the valve to the right.

Figure 3:
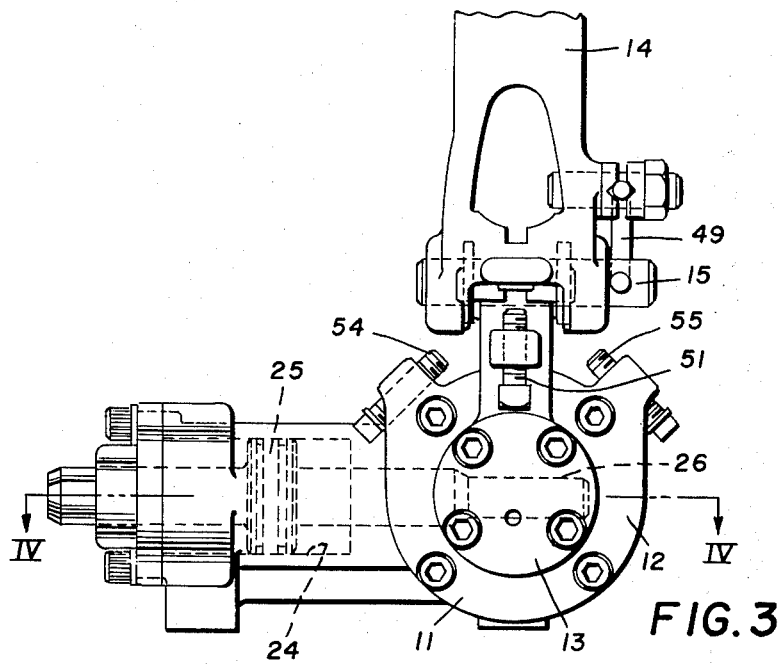
FIG. 3 is an end elevational view of the said portion of a remote shift.

In FIG. 3 it can be seen that the fixed portion 12 is provided with two inclined stop screws 54 and 55 to limit the rotation of the handle and the movable portion 13 (in the roll mode) about the axis B—B.

Figure 4:
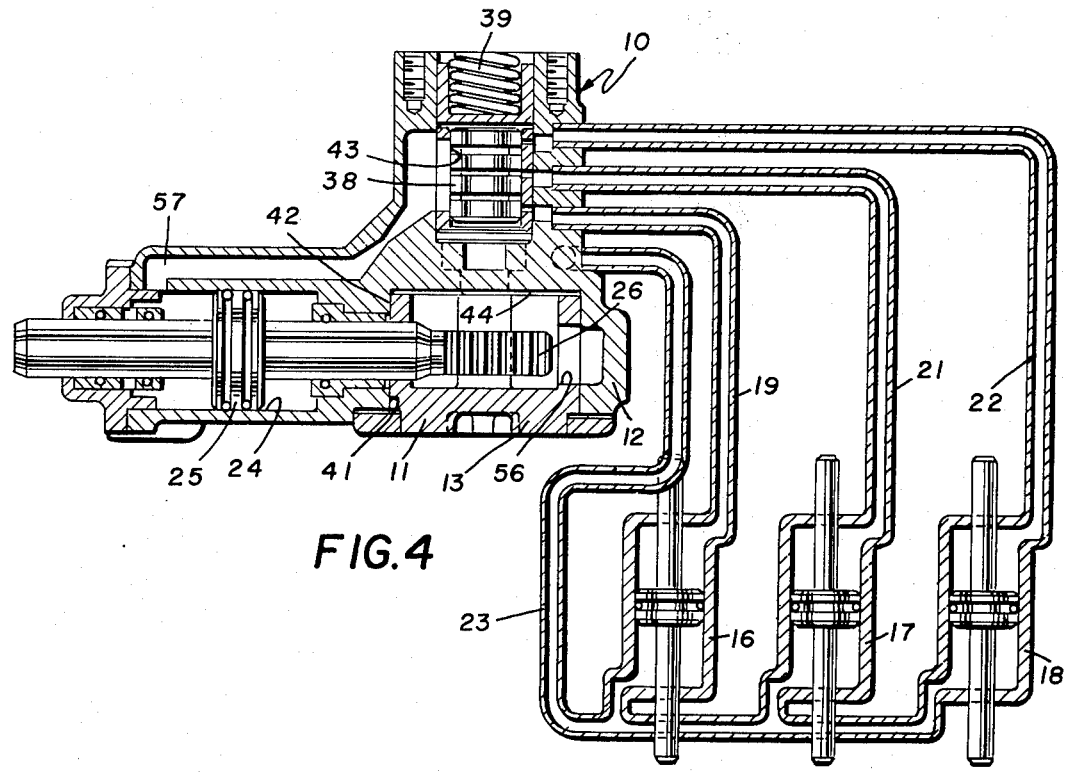
FIG. 4 is a horizontal sectional view of the invention taken on the line IV—IV of FIG. 3.

FIG. 4 shows the manner in which a discharge side of each of the hydraulic motors 16, 17, and 18 are connected together into the return line 23 which extends to the fixed portion 12 of the housing. The movable portion 13 of the housing is suitably provided with a slot 56 which allows the piston rod 26 to extend through it without interfering with its rotation about the axis B—B. The spool 38 is provided in the usual way with annular grooves which connect the pressure chamber 57 to one of the hydraulic lines 19, 21, and 22.

As shown in FIG. 5 it would be most convenient if the hydraulic lines 19, 21, 22, and 23 were incorporated into one flexible element 58 which may be provided with a metal core 59 for strength.

FIG. 6 shows particularly well the manner in which the hydraulic elements are connected together. The check valve 45 has been reversed for ease in understanding.

The operation of the remote shift will now be readily understood in view of the above description. The mechanical motion is carried through the gear shift handle 14. The gear shift is pivoted on a shaft 15 for motion (in pitch mode) about the axis A—A. The shaft 15, of course, connects the handle 14 to the movable housing 13 (which is formed of aluminum) and connected to a sintered steel internal gear 28. The movable portion 13, of course, is confined and revolved in the fixed housing 12. It allows movement of the handle in the pitch mode about the axis A—A and operates the piston 32 to produce hydraulic pressure. The roll mode movement of the handle 14 actuates the back and forth movement of the mule piston 25 by means of the internal spur gear teeth inside of the movable housing 13. These teeth mesh with the teeth on the idler 29, which in turn, mesh with the rack 27 on the piston rod 26.

An important function of the apparatus is related to the check valve 45, which is contained in the movable portion 13 of the housing. When the housing is revolved by operating the handle 14 in the roll mode, the check valve is controlled by the handle. The fact that it enables the check valve to open at the indentation on the plate 44. The indentation is positioned at a specific intermediate point on the plate and the check valve opens when the head of the valve meets this indentation under pressure from the spring 53. The indentation 47 is at the center of the range of roll mode motion and this is the neutral position. The roll mode motion of the handle is directly related to and coincides with the back and forth motion of the mule piston 25 and also operates the check valve 45. The pitch motion about the axis A—A controls the movement of the piston 32, which in turn, actuates the 3-way directional valve spool 38. The spool has the three grooves that line up with three slots in a sleeve in the bore 43 and the spool moves back and forth to align the grooves one at a time with corresponding slots in the sleeve which lead to the pressure fluid lines 19, 21, and 22. The directional valve is designed to remain in the center position by means of the compression spring 39, and this position is the rest position.

It is now evident that the pitch mode motion of the handle 14 controls the changing of the gates of the spool 38. Just as the directional valve 38 has a rest position, so the gear shift in the pitch mode has a rest position which is at the center and is maintained in that position by the torsion spring 49. This rest position is synchronized with the rest position of the spool 38. Therefore, if the operator moves the handle 14 to one side of the rest position, the first gate is engaged, and moving the lever in the other direction of the rest position engages the third gate. The three gates of the directional valve 38 control the flow of the hydraulic fluid from the chamber 57 of the mule piston 25 to the three cylinders or hydraulic motors 16, 17, and 18 which are in turn attached to the three shifting dogs on the transmission. The shifting dogs on the transmission are designed so that each shifting dog has three positions. The first shifting dog has a first gear position, a neutral position, and a second gear position. The second shifting dog has a third gear position, a neutral position, and a fourth gear position. The third shifting dog has a fifth gear position, a neutral position, and a reverse position. It should be noted that as one leaves a shifting dog to engage another, the former must be left in the neutral position in order to prevent two gears engaging at once. Since the 3-way directional valve determines which of the shifting dogs will be actuated by the piston 25 and since that shifting dog must be left in the neutral position when the directional valve changes gates, the directional valve cannot change gates until that condition is met. Therefore, since the roll mode motion of the handle 14 controls the piston 25 which, in turn, controls the hydraulic motors connected to the shifting dogs on the transmission, so also the roll mode controls the check valve 45. When the gear shift lever is in the neutral position, the piston is in the neutral position, the shifting dog is in the neutral position, and the check valve is open thus allowing the operator to change gates in the valve 38. The compression spring 39 on the first gate side of the spool acts inside of a check sleeve to stop the spool when the first gate groove and slot are aligned. The purpose of the spring is to return the spool to the second gate. At this point the spring and the check sleeve come to a stop and are held in check by the directional valve sleeve. For the third gate alignment the directional valve sleeve is longer than the spool by an amount equal to the distance the spool must move from the center at rest position to align both the third gate groove on the spool and the third gate slot on the directional valve sleeve. On the end of the third gate side of the sleeve there is a check means to stop the spool when the third gate is engaged. The spool returns to the rest position (which is the second gate) by means of the torsion spring acting simultaneously to return the handle to its rest position.

In order to operate the gear shift lever or handle 14 to provide a sequence of up-shifts starting at first gear, the operator begins at the neutral and at the rest positions indicated as N in FIG. 7. He then moves the handle West and then North to engage first gear. Then, maintaining a slight pressure to the West in order to prevent the directional spool from popping into its rest position when the gear shift lever passes the neutral position, the lever is moved from North to South in a straight line, thus, obtaining second gear. To shift from second gear to third, the gear shift lever should be allowed to return to its rest position while still engaged in second gear. The handle piston 32 will move in the same relationship with the shift piston 25 in order to supply the system with fluid evacuated by the piston 32. Since the check valve is closed, the only way the shift lever can move is by drawing the handle piston 35 down. The handle piston will return when the shift lever passes the neutral position, thus momentarily opening the check valve and allowing the directional spool 38 to pop into the second gate. Then, the lever is moved North again in a straight line. To shift into fourth gear the lever is moved South in a straight line to engage fourth gear. Shifting from fourth gear to fifth, the gear lever is moved to the neutral position and then East and then finally North. To engage reverse gear it is only necessary to start at the neutral and at rest position, and to move East and then South.

To disengage either fifth gear or reverse gear, the gear shift lever is brought to the neutral at rest position. The down-shifts are basically the opposite of the up-shifts, except that, when shifting from the second gate (third or fourth gear) to the first gate (first or second gear), an accumulator is provided. For example, when third gear is engaged and the operator wants to shift to second gear, the gear shift lever is moved West while still engaged in third gear. The shift piston 32 actuates the piston of the accumulator 37 (since the check valve is closed). While still maintaining the slight amount of pressure to the West, the gear shift lever is moved from North to South and, as the lever passes the neutral position, momentarily opening the check valve, the preloaded accumulator actuates the spool 38 into the first gate thus engaging second gear.

To further explain the accumulator action, the spring in the accumulator piston is designed to have a higher spring rate (pounds per inch of deflection) than the directional valve spring 39, so that the shift piston or the handle piston will not actuate the accumulator piston instead of the directional valve spool during normal operation. The accumulator piston can only be actuated when the check valve 45 is closed.

The handle piston 35, when operated by the actuator button 36, performs the same operation as the shift piston 32 in either controlling the directional valve while in the neutral position of the second gate, or actuating the accumulator while either third gear or fourth gear is engaged. This positions the directional valve spool in the first gate only and eliminates the need for moving or positioning the gear shift lever to the West. For example, if third gear is engaged and second gear is desired, the button on the handle is depressed while the gear shift lever is still engaged in third gear, thus preloading the accumulator until a North-to-South movement is performed, passing the neutral position, opening the check valve momentarily and allowing the accumulator to actuate the spool 38 into the first gate thus engaging second gear.

It can be seen that a specific pattern of gear shifting manipulation is not mandatory in that any combination of gear engagements may be performed with the knowledge and operation of the gear shifting mechanism of the present invention.

The advantages of the present invention will readily be seen in view of the above description. The present invention has succeeded in solving many problems by providing a hydraulic system that effectively eliminates the possibility of a user inadvertently misjudging and not finding the proper gear. Thus, it enables one to take full advantage of the inherent accuracy provided by the basic hydraulic gear changing mechanism. It provides an improved means for positively and accurately changing gears in a manual transmission. A definite advantage of the invention is the quickness and speed of changing gears that is possible. Due to its hydraulic structure and mechanical design, most shifting is done in a straight line. This is also suitable to the sport of automobile racing where such features would be a benefit. Due to its hydraulic components, the pattern in which the gear shift follows (for instance, going from first gear to second) is completely controlled hydraulically. Shifting gears through the hydraulic circuit thus insures accuracy and subsequently inspires better driving habits. The gate control button on the handle provides a means of changing shifting gates in the hydraulic system in addition to the normal operation of positioning the gear shift lever. Having eliminated many of the mechanical linkages of prior art devices, it is evident that considerable weight in the system is also eliminated. Since the connection between the gear shifting mechanism and the cylinders on the transmission is a flexible hose, the gear shifter can be mounted on a movable base, so that one can adjust the gear shift lever to suit the individual's requirements. Though a semi-complex system is used, the operation and control of this system takes place by the manipulation of one lever. Therefore, the operation is quite simple, but, nevertheless, the feeling of the synchro-gears and the main gears is still felt in the shifting handle.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Remote shift for use in a vehicle having an engine and a transmission, comprising
   a. a housing having a fixed portion and a movable portion, the fixed portion being provided with a large bore in which is rotatably carried a cylindrical element of the movable portion and a smaller bore extending coaxial of and extending from the bottom of the large bore,
   b. a shift handle pivotally mounted about a first axis on the movable portion of the housing,
   c. a plurality of hydraulic motors located at the transmission,
   d. a pressure hydraulic line connecting each motor to the housing,
   e. a return hydraulic line connecting all of the motors to the housing,
      the movable portion of the housing being mounted on the fixed portion of the housing for rotation about a second axis extending at a right angle to the axis of pivotal rotation of the handle, the rotation of the handle about the first axis and the rotation of the handle and the movable portion of the housing causing pressure to appear in the pressure hydraulic lines to operate the hydraulic motors,
   f. a plate extending across the bottom of the large bore in the fixed portion of the housing, the radial end surface of the cylindrical element of the movable portion sliding over the surface of the plate as the movable element rotates about the said second axis, and
   g. a check valve mounted in the said cylindrical element, the plate having an indentation located to be engaged by the check valve for the operation of the valve at the center of rotation of the movable element, the indentation serving as a signal felt through the shift lever to assist in determining the neutral position.

2. Remote shift as recited in claim 1, wherein the fixed portion of the housing has a bore extending at a right angle to the said second axis, a mule piston slidable in the bore, a piston rod extending coaxially of the piston and having a gear rack formed thereon, the movable portion of the housing having an internal gear engaging an idler gear mounted in the fixed portion of the housing which, in turn, engages the gear rack, so that rotation of the handle and the movable portion about the said axis causes movement of the mule piston to generate pressure in hydraulic fluid in an actuating circuit.

3. Remote shift as recited in claim 1, wherein the movable portion of the housing is formed with a bore extending perpendicular to and spaced from the said first axis, a piston slidable in the bore, a link joining the handle to the piston, so that rotation of the handle about the said first axis causes the piston to generate pressure in hydraulic fluid in a control circuit.

4. Remote shift as recited in claim 1, wherein a bore extends lengthwise of the handle and opening onto the free end of the handle, a piston slidable in the bore and having an extension extending externally of the bore in position to be engaged by the operator's thumb, so that movement of the piston generates pressure in hydraulic fluid in a control circuit.

5. Remote shift as recited in claim 4, wherein the control circuit contains a pressure accumulator.

6. Remote shift as recited in claim 5, wherein the control circuit contains a slidable spool which is moved against a spring by hydraulic pressure in the circuit, the position of the spool determining the passage of hydraulic pressure into one of the pressure hydraulic lines.

* * * * *